US009716593B2

(12) United States Patent
Mozer

(10) Patent No.: US 9,716,593 B2
(45) Date of Patent: Jul. 25, 2017

(54) LEVERAGING MULTIPLE BIOMETRICS FOR ENABLING USER ACCESS TO SECURITY METADATA

(71) Applicant: Sensory, Incorporated, Santa Clara, CA (US)

(72) Inventor: Todd F. Mozer, Los Altos Hills, CA (US)

(73) Assignee: Sensory, Incorporated, Santa Clara, CA (US)

( * ) Notice: Subject to any disclaimer, the term of this patent is extended or adjusted under 35 U.S.C. 154(b) by 0 days.

(21) Appl. No.: 14/620,032

(22) Filed: Feb. 11, 2015

(65) Prior Publication Data

US 2016/0234024 A1      Aug. 11, 2016

(51) Int. Cl.
| | | |
|---|---|---|
| *G06F 21/00* | (2013.01) | |
| *H04L 9/32* | (2006.01) | |
| *G06F 21/32* | (2013.01) | |
| *H04L 29/06* | (2006.01) | |

(52) U.S. Cl.
CPC ............ *H04L 9/3231* (2013.01); *G06F 21/32* (2013.01); *H04L 63/0861* (2013.01)

(58) Field of Classification Search
CPC .......... G06F 21/31; G06F 21/34; G06F 21/32; G07F 7/1008; G07F 7/10; G06Q 20/341; G07C 9/00087; H04L 63/08
USPC .................................................. 713/184, 186
See application file for complete search history.

(56) References Cited

U.S. PATENT DOCUMENTS

| | | | | |
|---|---|---|---|---|
| 6,973,575 B2* | 12/2005 | Arnold | ..................... | G06F 21/32 |
| | | | | 713/168 |
| 7,715,532 B2* | 5/2010 | Simpson | ............... | H04M 3/382 |
| | | | | 370/353 |
| 8,078,472 B2* | 12/2011 | Resch | ..................... | G10L 17/00 |
| | | | | 704/275 |
| 8,442,187 B2* | 5/2013 | Jaiswal | ................. | H04M 3/382 |
| | | | | 379/126 |
| 8,639,937 B2* | 1/2014 | Bagga | ..................... | G06F 21/46 |
| | | | | 707/758 |
| 9,147,117 B1* | 9/2015 | Madhu | ................ | H04L 63/0861 |
| 2002/0023059 A1* | 2/2002 | Bari | ........................ | G06F 21/41 |
| | | | | 705/76 |
| 2002/0091937 A1* | 7/2002 | Ortiz | ................... | H04L 63/0861 |
| | | | | 726/5 |
| 2003/0037004 A1* | 2/2003 | Buffum | ................... | G06F 21/32 |
| | | | | 705/51 |
| 2006/0085189 A1* | 4/2006 | Dalrymple | ............. | G10L 17/06 |
| | | | | 704/250 |

(Continued)

*Primary Examiner* — Ali Abyaneh
(74) *Attorney, Agent, or Firm* — Fountainhead Law Group P.C.

(57) ABSTRACT

Techniques for leveraging multiple biometrics for enabling user access to security metadata are provided. In one embodiment, a computing device can receive first and second biometric identifiers from a user. The computing device can further determine, via a multi-biometric authentication system, that the user's identity can be verified using the first biometric identifier, but cannot be, or has not been, verified using the second biometric identifier. In response to this determination, the computing device can provide information to the user for facilitating verification of the user's identity using the second biometric identifier.

15 Claims, 4 Drawing Sheets

(56) References Cited

U.S. PATENT DOCUMENTS

| | | | | |
|---|---|---|---|---|
| 2012/0075452 A1* | 3/2012 | Ferren | ............... | G02B 13/0065 |
| | | | | 348/78 |
| 2013/0223596 A1* | 8/2013 | Kojima | ............... | A61B 6/4405 |
| | | | | 378/102 |
| 2013/0305324 A1* | 11/2013 | Alford, Jr. | ............. | G06F 21/31 |
| | | | | 726/5 |
| 2014/0137216 A1* | 5/2014 | Mohler | .................. | G06F 21/45 |
| | | | | 726/5 |
| 2014/0257807 A1* | 9/2014 | Mauro | ................... | G10L 21/06 |
| | | | | 704/235 |
| 2014/0337945 A1* | 11/2014 | Jia | ...................... | H04L 63/0876 |
| | | | | 726/6 |

\* cited by examiner

LEVERAGING MULTIPLE BIOMETRICS FOR ENABLING USER ACCESS TO SECURITY METADATA

BACKGROUND

In recent years, biometric authentication has become a popular alternative to password, PIN, and pattern-based authentication because biometric characteristics do not need to be remembered—such characteristics are intrinsic to each user. One downside to this aspect of biometrics is that, if a user's biometric is stolen or otherwise comprised, it may be difficult or impossible to change it (depending on the nature of the biometric) for authentication purposes. For example, assume a user A configures his/her smartphone to unlock upon recognizing his/her face. If a malicious user B circumvents this face-based authentication by, e.g., using a photograph of user A's face to gain access to user A's smartphone, there is no practical way for user A to change his/her face biometric in order to lock out malicious user B. Instead, user A will need to reconfigure his/her smartphone to authenticate his/her identity using a different biometric, or possibly a non-biometric method.

There are certain types of biometrics that are changeable to an extent by a user. For instance, a text-dependent voice password/passphrase is based on both the characteristics of a user's voice as well as the particular words spoken by the user. The spoken password/passphrase can be changed at-will through a retraining process. When this type of biometric is used for authentication, maximum security is achieved if the spoken password/passphrase is kept secret, thereby forcing a malicious user to not only replicate the user's voice, but also replicate the actual words trained by the user. However, this then creates the problem mentioned above of requiring the user to remember his/her spoken password/passphrase.

SUMMARY

Techniques for leveraging multiple biometrics for enabling user access to security metadata are provided. In one embodiment, a computing device can receive first and second biometric identifiers from a user. The computing device can further determine, via a multi-biometric authentication system, that the user's identity can be verified using the first biometric identifier, but cannot be, or has not been, verified using the second biometric identifier. In response to this determination, the computing device can provide information to the user for facilitating verification of the user's identity using the second biometric identifier.

A further understanding of the nature and advantages of the embodiments disclosed herein can be realized by reference to the remaining portions of the specification and the attached drawings.

DETAILED DESCRIPTION

Figure 1:
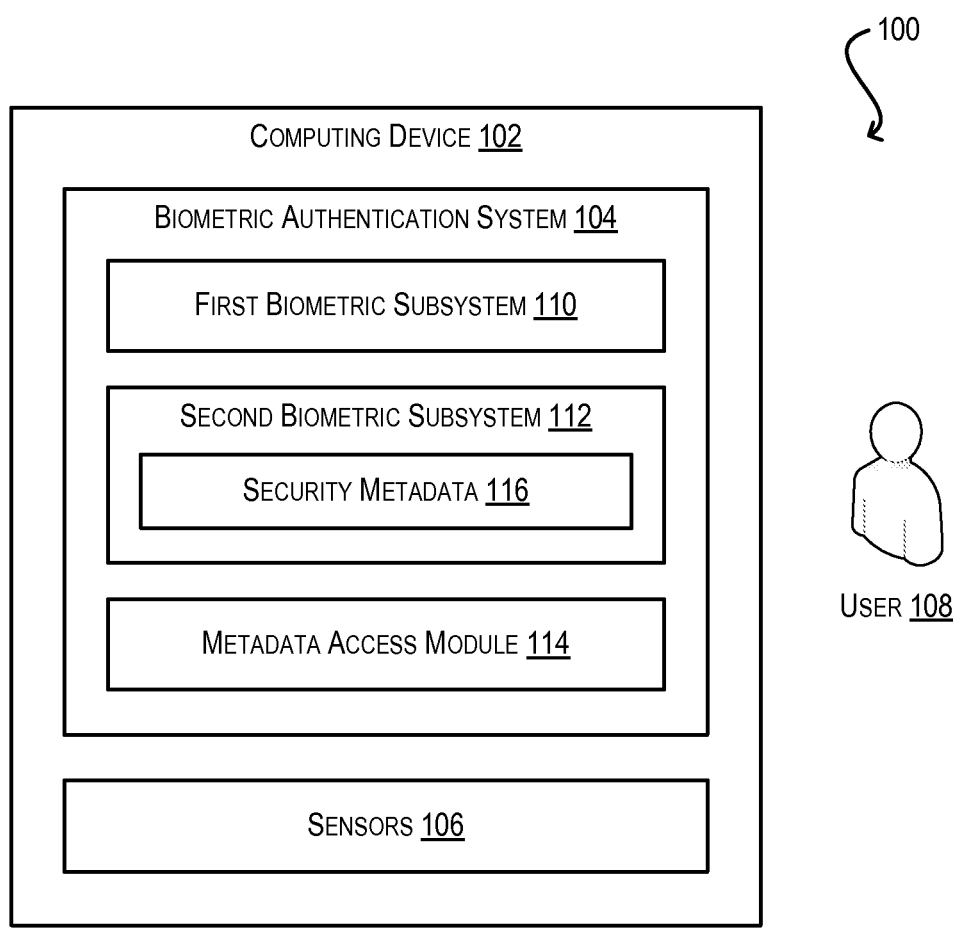
FIG. 1 depicts a system environment according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that can be performed by a computing device for enabling a user to securely access his/her security metadata for a particular biometric authentication method (e.g., spoken password/passphrase) at the point of authentication. These techniques can avoid the need for the user to remember such security metadata, while keeping the metadata secret from others.

In one set of embodiments, the computing device can receive first and second biometric identifiers from a user, where the first biometric identifier is not changeable (e.g., face, retinal pattern, iris pattern, fingerprint, etc.), while the second biometric identifier is changeable via preconfigured security metadata (e.g., a text-dependent voice password/passphrase). The computing device can then attempt to verify the user's identity using both biometric identifiers. If the computing device is able to verify the user's identity using the first biometric identifier but is unable to verify (or has not verified) the user's identity using the second biometric identifier, the computing device can assume that the user misremembered (or otherwise failed to present) the correct security metadata for the second biometric identifier. For instance, if the second biometric identifier is a spoken password/passphrase, the computing device can assume that the user misremembered or misspoke the correct password/passphrase. Accordingly, in this situation, the computing device can provide the correct security metadata (or information related thereto) to the user, thereby allowing the user to attempt authentication again via the second biometric identifier (using the provided metadata).

With the approach described above, there is no need for the user to remember the security metadata for the second biometric identifier, because he/she can be automatically provided with that information at the point of authentication (if the user's identity is verified using the first biometric identifier). Thus, this approach is preferable from an ease-of-use perspective over non-biometric authentication solutions (e.g., written password-based authentication, pattern-based authentication, PIN-based authentication, etc.). At the same time, the user can change the security metadata for the second biometric identifier at-will, and can keep it secret from others. Thus, this approach is also preferable from a security perspective over conventional biometric authentication solutions that rely solely on non-changeable biometric characteristics (e.g., face-based authentication, retina-based authentication, etc.).

These and other features are described in further detail in the sections that follow.

2. System Environment

FIG. 1 depicts a high-level system environment 100 according to an embodiment. As shown, system environment 100 includes a computing device 102 comprising a biometric authentication system 104 and biometric sensors 106. In one set of embodiments, computing device 102 can be a mobile device, such as a smartphone, a tablet, or a wearable device (e.g., smartwatch, smart armband/wristband, etc.). Computing device 102 can also be any other type of electronic device, such as a desktop computer system, laptop, set-top or home automation/security box, or the like. Biometric sensors 106 can include, e.g., a camera, a microphone, a retinal or iris scanner, a fingerprint sensor, and/or any other biometric sensors known in the art.

In operation, computing device 102 can use biometric authentication system 104 to secure one or more functions on device 102. For example, assume computing device 102 is a smartphone that includes a "device unlock" function secured via system 104. In this case, biometric authentication system 104 can require a user (e.g., user 108) that wishes to unlock the device to present one or more biometric characteristics to biometric sensors 106. Biometric sensors 106 can capture the biometric characteristics and provide them to system 104. Biometric authentication system 104 can then compare the captured biometric characteristics against enrollment templates for one or more enrolled device users and determine, based on those comparisons, whether the identity of user 108 can be verified. If so, user 108 is authenticated and allowed to unlock computing device 102. If the identity of user 108 cannot be verified, the user is rejected as an imposter and computing device 102 remains locked.

As noted the Background section, one limitation with existing biometric authentication systems is that certain types of biometrics cannot be easily changed or reset in cases where they are compromised/stolen. Examples of such "unchangeable" biometrics include face data, retinal or iris data, fingerprint data, etc. While there are some biometrics that can be changed, like text-dependent voice passwords/passphrases, these biometrics require the passwords/passphrases to be kept secret in order to achieve maximum security, which can be burdensome for end-users.

To address the foregoing and other similar issues, biometric authentication system 104 of FIG. 1 includes a first biometric subsystem 110, a second biometric subsystem 112, and a metadata access module 114. First biometric subsystem 110 can be a biometric authenticator that relies on an "unchangeable" biometric (e.g., face, retina, iris, fingerprint, etc.). On the other hand, second biometric subsystem 112 can be a biometric authenticator that relies on a "changeable" biometric (i.e., a biometric that is based, in part, on preconfigured security metadata 116, such as a text-dependent voice password/passphrase).

As described in further detail below, when user 108 wishes to authenticate himself/herself to computing device 102, biometric authentication system 104 can use first subsystem 110 to try and verify user 108's identity via a first biometric identifier that corresponds to the unchangeable biometric supported by subsystem 110 (e.g., face data). Biometric authentication system 104 can further use second subsystem 112 to try and verify user 108's identity via a second biometric identifier that corresponds to the changeable biometric supported by subsystem 112 (e.g., a spoken password/passphrase). If biometric authentication system 104 can verify user 108's identity using first biometric subsystem 110 but cannot verify (or has not verified) user 108's identity using second biometric subsystem 112, biometric authentication subsystem 104 can determine that user 108 is likely a valid (e.g., enrolled user), but has misremembered, failed to remember, or otherwise failed to present the security metadata 116 associated with his/her second biometric identifier. In this scenario, biometric authentication system 104 can provide, via metadata access module 114, security metadata 116 (or information relating thereto, such as a hint) to user 108, thereby allowing user 108 to attempt authentication again using the presented metadata.

It should be appreciated that system environment 100 of FIG. 1 is illustrative and not intended to limit embodiments of the present invention. For instance, although biometric authentication subsystem 104 and its constituent components are shown as being executed on computing device 102, in other embodiments some (or all) of the processing attributed to these components may be performed by a separate device/system (e.g., a remote server). In these embodiments, computing device 102 can transmit biometric data captured via sensors 106 to the remote server, which can perform authentication processing and return an authentication result to device 102.

Further, although biometric sensors 106 are shown as being integrated into computing device 102, in other embodiments some (or all) of biometric sensors 106 may be resident in another device or housing that is separate from computing device 102. In these and other similar scenarios, biometric data captured via biometric sensors 106 can be relayed to computing device 102 via an appropriate communication link (e.g., a wired or wireless link).

Yet further, the components of system environment 100 can include other subcomponents or features that are not specifically described or shown. One of ordinary skill in the art will recognize many variations, modifications, and alternatives.

3. Workflows

Figure 2:
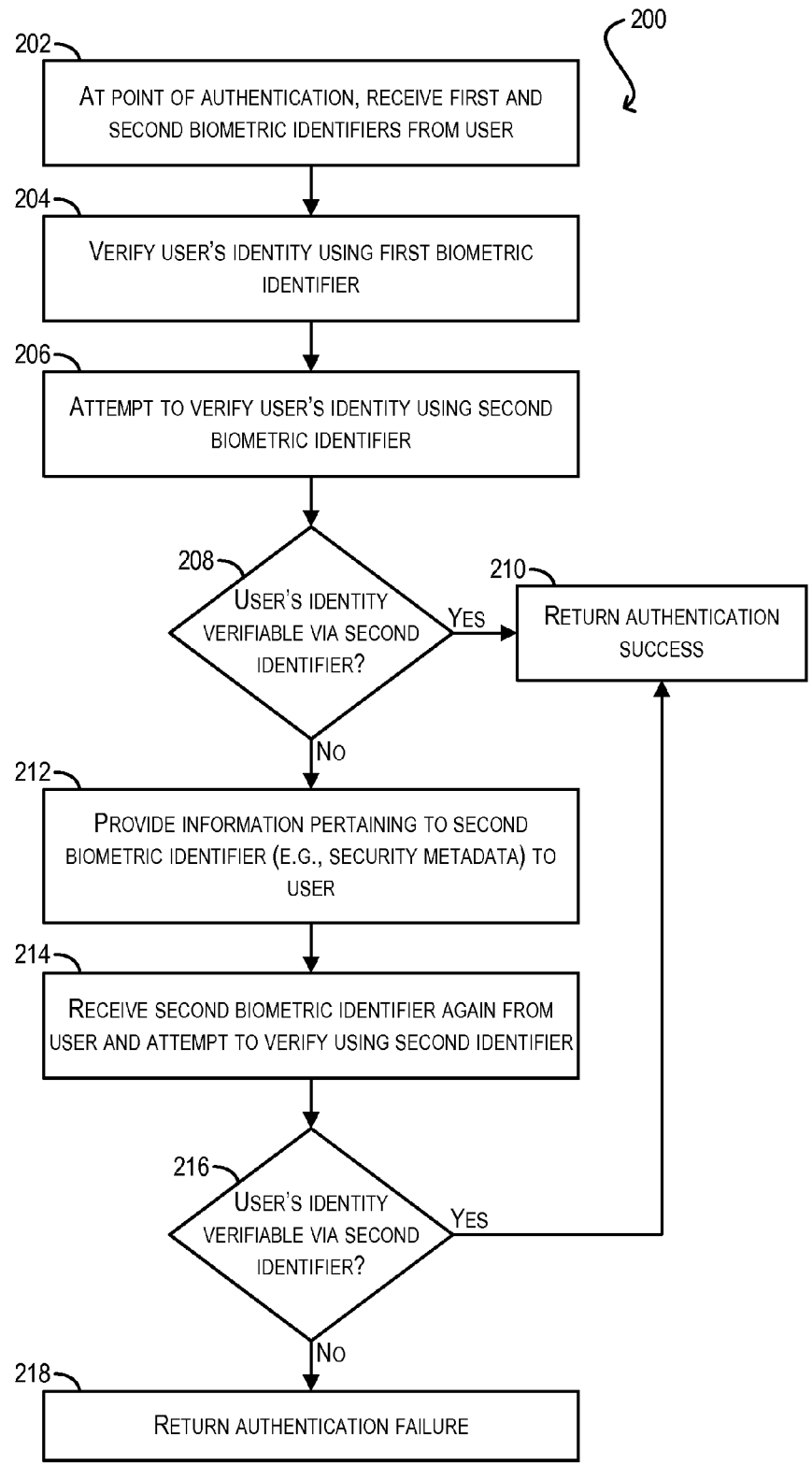
FIG. 2 depicts a flowchart for enabling user access to security metadata via multiple biometrics according to an embodiment.

FIG. 2 depicts a high-level workflow 200 that can be carried out by biometric authentication system 104 for enabling user access to security metadata via multiple biometrics according to an embodiment. At block 202, biometric authentication system 104 can receive, at an authentication event, first and second biometric identifiers from a user (e.g., user 108 of FIG. 1) via biometric sensors 106. In one embodiment, the first biometric identifier can correspond to one or more images of user 108's face, and the second biometric identifier can correspond to text-dependent speech (i.e., a spoken password/passphrase) uttered by user 108. In alternative embodiments, the first biometric identifier can correspond to any other type of unchangeable biometric (e.g., retina, iris, peri-ocular regions, fingerprint, etc.), and the second biometric identifier can correspond to any other type of changeable biometric.

At block 204, biometric authentication system 104 can verify, via first subsystem 110, user 108's identity using the first biometric identifier. For example, in the case where the first biometric identifier comprises face data, system 104 can verify user 108's identity based on his/her face. Then, at block 206, biometric authentication system 104 can attempt to verify, via second subsystem 112, user 108's identity using the second biometric identifier. For example, in the case where the second biometric identifier comprises a spoken password/passphrase, system 104 can attempt to verify user 108's identity based on the uttered password/passphrase.

If biometric authentication system 104 determines that user 108's identity is verifiable based on the second biometric identifier (block 208), system 104 can return a successful authentication result (block 210) and workflow 200 can end.

However, if biometric authentication system 104 determines that user 108's identity is not verifiable based on the second biometric identifier or has not been verified (block 208), system 104 can automatically provide (via metadata access module 114) information pertaining to the second identifier to user 108 (block 212). For instance, in one embodiment, biometric authentication system 104 can provide the actual security metadata associated with the second biometric identifier to user 108 (e.g., his/her password/passphrase). In another embodiment, biometric authentication system 104 can provide information that is related to the security metadata, such as a password/passphrase hint, to user 108. This information can be provided to user 108 in different ways, such as being presented on a display of computing device 102, vocalized through a speaker of computing device 102, and so on.

In scenarios where biometric authentication system 104 determines that user 108's identity has not yet been verified/confirmed based on the second biometric identifier at block 208, system 104 can optionally wait for a preconfigured period of time before providing the information pertaining to the second identifier to user 108.

Further, in scenarios where biometric authentication system 104 determines that user 108's identity cannot be verified based on the second biometric identifier at block 208, system 104 can optionally take further steps to determine why the verification failed, and condition the performance of block 212 based on that determination. For instance, if biometric authentication system 104 determines that user 108's voice matches an enrolled user's voice (via, e.g., a text-independent speech recognizer), but the spoken password/passphrase is incorrect, system 104 can provide the password/passphrase to the user per block 212. However, if biometric authentication system 104 determines that user 108's voice does not match an enrolled user's voice, system 104 can refrain from providing any information to user 108 and immediately return an authentication failure (since user 108 is likely to be an imposter).

Once the information pertaining to the second biometric identifier is provided to the user, biometric authentication system 104 can receive the second biometric identifier again from user 108 and can attempt to authenticate the user again using this newly-received identifier (block 214). It is assumed that user 108 is aware of his/her appropriate security metadata at this point and thus is capable of providing an acceptable biometric sample (e.g., an acceptable utterance of his/her voice password/passphrase).

If biometric authentication system 104 can verify user 108's identity using the newly-received second biometric identifier (block 216), system 104 can generate a successful authentication result as mentioned previously (block 210) and workflow 200 can end.

On the other hand, if biometric authentication system 104 cannot verify user 108's identity using the newly-received second biometric identifier (block 216), system 104 can determine that user 108 is an imposter and can return an authentication failure (block 218).

It should be appreciated that workflow 200 of FIG. 2 is illustrative and various modifications are possible. For example, although not shown in FIG. 2, in some embodiments biometric authentication system 104 may provide the information pertaining to the second biometric identifier to user 108 (per block 212) only if a score or "closeness of fit" determined for user 108 with respect to the first biometric identifier and one or more enrollment templates is above a preconfigured threshold. This ensures that system 104 is certain (above a threshold level) that user 108 is an enrolled user before divulging potential secret metadata/information to the user.

Figure 3:
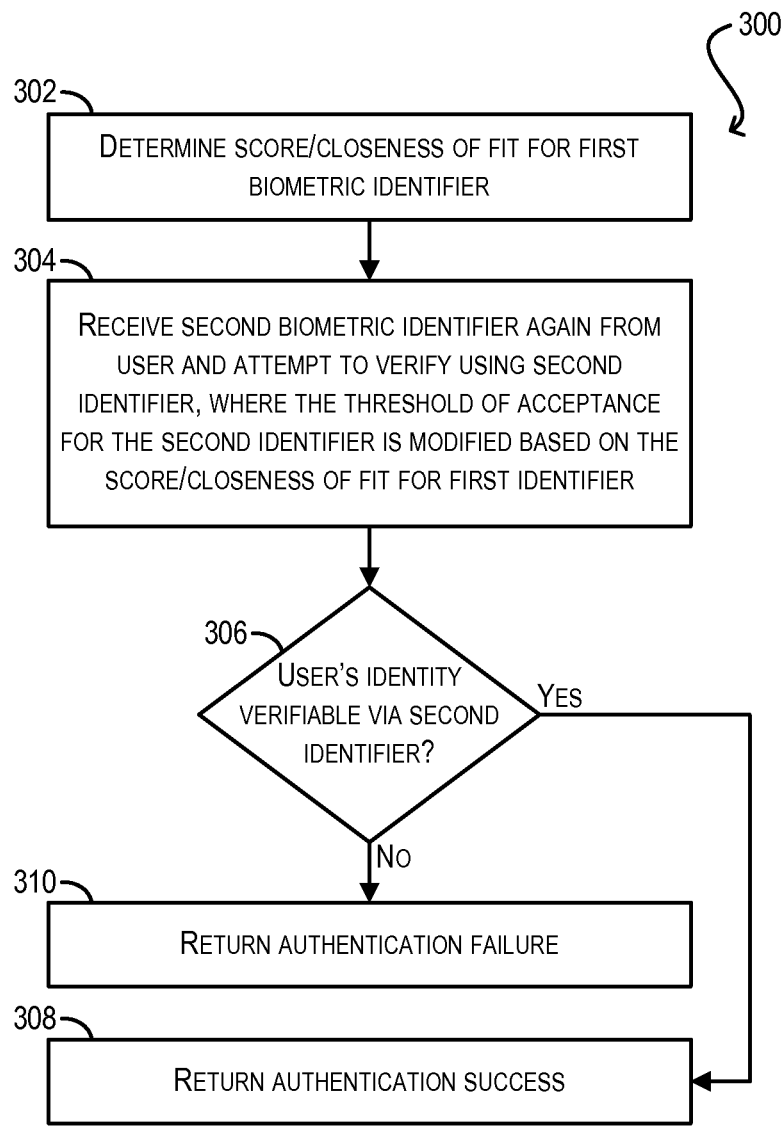
FIG. 3 depicts a flowchart for modifying a threshold of acceptance for one biometric based on the score/closeness of fit determined for another biometric according to an embodiment.

In further embodiments, biometric authentication system 104 can use the score/closeness of fit determined with respect to the first biometric identifier to dynamically modify a threshold of acceptance for the second biometric identifier (at, e.g., block 216 of FIG. 2). In this way, system 104 can tune the overall authentication process in accordance with its level of confidence in its evaluation of the first biometric identifier. FIG. 3 depicts a workflow 300 of such a process according to an embodiment. In a particular embodiment, biometric authentication system 104 can carry out workflow 300 upon completing block 212 of FIG. 2 (in lieu of blocks 214-218).

Starting with block 302 of FIG. 3, biometric authentication system 104 can determine a score/closeness of fit for the first biometric identifier. Then, at block 304, biometric authentication system 104 can receive the second biometric identifier again from user 108 and attempt to verify the user using this newly received identifier. However, rather than using the same threshold of acceptance used at block 208, system 104 can modify the threshold of acceptance for the newly-received second biometric identifier based on the score/closeness of fit for the first biometric identifier. For example, assume that biometric authentication system 104 has very high confidence that user 108 is, in fact, an enrolled user based on its evaluation of the first biometric identifier. In this case, system 104 may slightly lower (or leave unchanged) the threshold of acceptance needed to verify the user's identity using the second biometric identifier. Alternatively, assume that biometric authentication system 104 has only average confidence that user 108 is an enrolled user based on its evaluation of the first biometric identifier. In this case, system 104 may raise the threshold of acceptance needed to verify the user's identity using the second biometric identifier (in order to maintain a high level of security for the overall authentication process).

The remaining portions of workflow 300 (blocks 306-310) are substantially similar to blocks 216, 210, and 218 of FIG. 2.

4. Exemplary Computer Device

Figure 4:
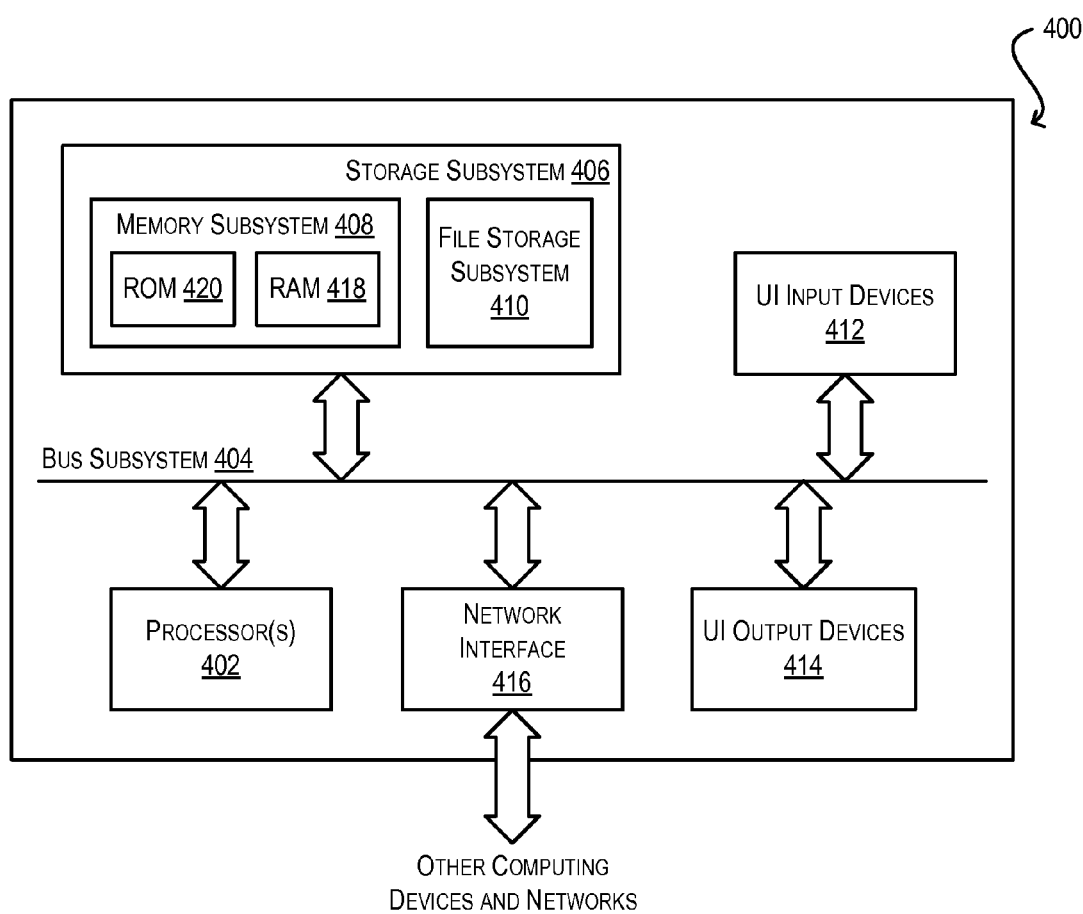
FIG. 4 depicts an exemplary computing device according to an embodiment.

FIG. 4 is a simplified block diagram of a computing device 400 that may be used to implement the foregoing embodiments of the present invention. For example, device 400 can be used to implement computing device 102 of FIG. 1. As shown, computing device 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 provides a mechanism for letting the various components and subsystems of computing device 400 communicate with each other as intended. Although bus subsystem 404 is shown schematically as a single bus, alternative embodiments of the bus subsystem can utilize multiple buses.

Network interface subsystem 416 serves as an interface for communicating data between computing device 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

User interface input devices 412 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 400.

User interface output devices 414 can include a display subsystem (e.g., a flat-panel display), an audio output device (e.g., a speaker), and/or the like. In general, use of the term "output device" is intended to include all possible types of devices and mechanisms for outputting information from computing device 400.

Storage subsystem 406 includes a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 400 is illustrative and not intended to limit embodiments of the present invention. Many other configurations having more or fewer components than computing device 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims.

For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    receiving, by a computing device at a time of authenticating a user, first and second biometric identifiers from the user, the second biometric identifier being an utterance of a password or passphrase by the user;
    determining, by a multi-biometric authentication system executing on the computing device, that the user's identity is verifiable using the first biometric identifier;
    in response to determining that the user's identity is verifiable using the first biometric identifier, determining, by the multi-biometric authentication system:
        whether the utterance matches vocal characteristics of an enrolled voice for the user; and
        whether the password or passphrase matches an enrolled password or passphrase for the user; and
    when the utterance matches the vocal characteristics of the enrolled voice for the user but the password or passphrase does not match the enrolled password or passphrase for the user:
        providing, by the computing device, the enrolled password or passphrase to the user;
        prompting, by the computing device, the user to utter the enrolled password or passphrase that has been provided;
        in response to the prompting, receiving, by the computing device, an utterance of the enrolled password or passphrase; and
        upon verifying the user's identity based on the utterance of the enrolled password or passphrase, generating a successful authentication result for the user.

2. The method of claim 1 wherein the first biometric identifier corresponds to face data, retinal data, iris data, peri-ocular data, or fingerprint data.

3. The method of claim 1 wherein providing the enrolled password or passphrase to the user comprises showing the enrolled password or passphrase to the user via a display of the computing device or speaking the enrolled password or passphrase to the user via a speaker of the computing device.

4. The method of claim 1 wherein the enrolled password or passphrase is provided to the user only if a score or closeness of fit determined for the first biometric identifier exceeds a predefined threshold.

5. The method of claim 4 wherein the score or closeness of fit determined for the first biometric identifier is used to determine a threshold of acceptance for the second biometric identifier.

6. The method of claim 1 wherein the computing device is configured to wait for a preconfigured period of time before providing the enrolled password or passphrase to the user.

7. A non-transitory computer readable medium having stored thereon program code executable by a processor, the program code comprising:
    code that causes the processor to receive, at a time of authenticating a user, first and second biometric identifiers from the user, the second biometric identifier being an utterance of a password or passphrase by the user;
    code that causes the processor to determine that the user's identity is verifiable using the first biometric identifier;
    in response to determining that the user's identity is verifiable using the first biometric identifier, code that causes the processor to determine:
        whether the utterance matches vocal characteristics of an enrolled voice for the user; and
        whether the password or passphrase matches an enrolled password or passphrase for the user; and
    when the utterance matches the vocal characteristics of the enrolled voice for the user but the password or passphrase does not match the enrolled password or passphrase for the user:
        code that causes the processor to provide the enrolled password or passphrase to the user;
        code that causes the processor to prompt the user to utter the enrolled password or passphrase that has been provided;
        code that causes the processor to, in response to the prompting, receive an utterance of the enrolled password or passphrase; and code that causes the processor to generate a successful authentication result for the user upon verifying the user's identity based on the utterance of the enrolled password or passphrase.

8. The non-transitory computer readable medium of claim 7 wherein the first biometric identifier corresponds to face data, retinal data, iris data, peri-ocular data, or fingerprint data.

9. The non-transitory computer readable medium of claim 7 wherein the enrolled password or passphrase is provided to the user only if a score or closeness of fit determined for the first biometric identifier exceeds a predefined threshold.

10. The non-transitory computer readable medium of claim 9 wherein the score or closeness of fit determined for the first biometric identifier is used to determine a threshold of acceptance for the second biometric identifier.

11. A computing device comprising:
a multi-biometric authentication subsystem;
a processor; and
a memory having stored thereon program code that, when executed by the processor, causes the processor to:
receive, at a time of authenticating a user, first and second biometric identifiers from the user, the second biometric identifier being an utterance of a password or passphrase by the user;
determine, via the multi-biometric authentication system, that the user's identity is verifiable using the first biometric identifier;
in response to determining that the user's identity is verifiable using the first biometric identifier, determine:

whether the utterance matches vocal characteristics of an enrolled voice for the user; and
whether the password or passphrase matches an enrolled password or passphrase for the user; and
when the utterance matches the vocal characteristics of the enrolled voice for the user but the password or passphrase does not match the enrolled password or passphrase for the user:
provide the enrolled password or passphrase to the user;
prompt the user to utter the enrolled password or passphrase that has been provided;
in response to the prompting, receive an utterance of the enrolled password or passphrase; and
upon verifying the user's identity based on the utterance of the enrolled password or passphrase, generate a successful authentication result for the user.

12. The computing device of claim 11 wherein the first biometric identifier corresponds to face data, retinal data, iris data, peri-ocular data, or fingerprint data.

13. The computing device of claim 11 wherein the enrolled password or passphrase is provided to the user only if a score or closeness of fit determined for the first biometric identifier exceeds a predefined threshold.

14. The computing device of claim 13 wherein the score or closeness of fit determined for the first biometric identifier is used to determine a threshold of acceptance for the second biometric identifier.

15. The computing device of claim 11 wherein the computing device is a mobile device.

* * * * *